(12) United States Patent
Balakrishnan et al.

(10) Patent No.: US 9,684,753 B2
(45) Date of Patent: Jun. 20, 2017

(54) TECHNIQUES FOR GENERATING NANOWIRE PAD DATA FROM PRE-EXISTING DESIGN DATA

(71) Applicant: International Business Machines Corporation, Armonk, NY (US)

(72) Inventors: Karthik Balakrishnan, New York, NY (US); Josephine B. Chang, Mahopac, NY (US); Michael A. Guillorn, Yorktown Heights, NY (US); Jeffrey W. Sleight, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 14/299,496

(22) Filed: Jun. 9, 2014

(65) Prior Publication Data

US 2015/0356223 A1    Dec. 10, 2015

(51) Int. Cl.
*G06F 17/50* (2006.01)
*H01L 29/06* (2006.01)
*H01L 21/84* (2006.01)

(52) U.S. Cl.
CPC ...... *G06F 17/5068* (2013.01); *G06F 17/5072* (2013.01); *G06F 2217/12* (2013.01); *H01L 21/84* (2013.01); *H01L 29/0669* (2013.01)

(58) Field of Classification Search
CPC ............. G06F 17/5068; G06F 17/5072; G06F 2217/12; H01L 21/84; H01L 29/0669
See application file for complete search history.

(56) References Cited

U.S. PATENT DOCUMENTS

| 6,553,561 | B2 * | 4/2003 | Bard ................... G06F 17/5068 716/55 |
| 7,892,945 | B2 | 2/2011 | Bedell et al. |
| 8,173,993 | B2 | 5/2012 | Bangsaruntip et al. |

(Continued)

OTHER PUBLICATIONS

Iwai et al., "Si Nanowire Device and its Modeling," 2010 International Conference on Simulation of Semiconductor Processes and Devices (SISPAD), pp. 63-66 (Sep. 2010).

(Continued)

*Primary Examiner* — Naum B Levin
(74) *Attorney, Agent, or Firm* — Louis J. Percello; Michael J. Chang, LLC

(57) ABSTRACT

In one aspect, a CAD-based method for designing a lithographic mask for nanowire-based devices is provided which includes the steps of: create a design for the mask from existing (e.g., FINFET or planar CMOS) design data which includes, for each of the devices, one or more nanowire mask shapes (FINFET design data) or continuous shapes (planar CMOS design data); for FINFET design data, merging the nanowire mask shapes into continuous shapes; expanding the continuous shapes to join all of the continuous shapes in the design together forming a single polygon shape; removing the continuous shapes from the single polygon shape resulting in landing pad shapes for anchoring the nanowire mask shapes; for CMOS design data, dividing the continuous active shapes into one or more nanowire mask shapes; and merging the landing pad shapes with the nanowire mask shapes to form the lithographic mask.

10 Claims, 10 Drawing Sheets

(56) References Cited

U.S. PATENT DOCUMENTS

| | | | |
|---|---|---|---|
| 8,296,702 B2 * | 10/2012 | Mukherjee | G06F 17/5068 |
| | | | 716/110 |
| 8,298,881 B2 | 10/2012 | Sleight et al. | |
| 8,409,690 B2 | 4/2013 | Wallace et al. | |
| 8,445,337 B2 | 5/2013 | Bangsaruntip et al. | |
| 8,492,208 B1 | 7/2013 | Cohen et al. | |
| 8,869,089 B2 * | 10/2014 | Baek | G06F 17/5081 |
| | | | 716/122 |
| 9,134,254 B2 * | 9/2015 | Ramachandran | G01N 21/9501 |
| 2011/0076827 A1 | 3/2011 | Liu et al. | |
| 2012/0233575 A1 * | 9/2012 | Kashyap | G06F 17/5068 |
| | | | 716/55 |
| 2012/0256242 A1 | 10/2012 | Chang et al. | |
| 2012/0305886 A1 | 12/2012 | Sleight et al. | |
| 2013/0105897 A1 | 5/2013 | Bangsaruntip et al. | |

OTHER PUBLICATIONS

Anonymous, "A Nanowire eDRAM Structure and Method with Metal-Insulator-Metal Capacitors (MIMCAP) and Transmission Gates for Cell Access," IP.COM, IPCOM000223283D (Nov. 15, 2012).

IBM, Hicks et al., "Generalized Landing Pads," IP.COM, IPCOM000114368D (Mar. 28, 2005).

* cited by examiner

TECHNIQUES FOR GENERATING NANOWIRE PAD DATA FROM PRE-EXISTING DESIGN DATA

FIELD OF THE INVENTION

The present invention relates to nanowire-based devices having landing pads to anchor/tether the nanowires, and more particularly, to techniques for automatically placing nanowire landing pads in a device design derived from existing design data (e.g., FIN field effect transistor (FIN-FET) or planar complementary metal oxide semiconductor (CMOS) design data) which does not already include landing pads in the design.

BACKGROUND OF THE INVENTION

Gate-all-around (or GAA) nanowire devices are a promising candidate for complementary metal oxide semiconductor (CMOS) device scaling. Some GAA nanowire device designs form the gate electrode around a freely suspended wire(s). In that case, each freely suspended wire requires tethering, anchor or landing pad structures.

For silicon-on-insulator (SOI) nanowires this can be formed by making a landing pad of continuous SOI adjacent to a grouping of nanowires. Thus, multiple nanowires can share the same landing pads wherein, for example, the nanowires and pads are arranged in a ladder-like configuration with the pads attached at opposite ends of the nanowires and where the nanowires look like the rungs of a ladder. Multiple gates are often then patterned over the set of nanowires and landing pads in a given active area of a wafer.

Thus when planning devices having freely suspended wires, designers must include landing pads in the design. However, the specifications of the various devices in the design oftentimes vary from one device to another. For instance, variations in the nanowire length are common as well as the number of nanowires in parallel for a given device or set of devices. Accordingly, the placement and size of the landing pads will also vary.

Based on this device variation, manually placing each of the landing pads in the correct location in the design can be an extremely time-consuming process. Thus, techniques for automating the landing pad design process based on data about the device would be desirable.

SUMMARY OF THE INVENTION

The present invention provides techniques for automatically placing nanowire landing pads in a device design derived from existing design data (e.g., FIN field effect transistor (FINFET) or planar complementary metal oxide semiconductor (CMOS) design data) which does not already include landing pads in the design. In one aspect of the invention, a computer-aided design (CAD)-based method for designing a lithographic mask for nanowire-based devices is provided which includes the steps of: (a) creating a design for the lithographic mask from existing design data, wherein the design includes one or more nanowire mask shapes for each of the nanowire-based devices; (b) merging the nanowire mask shapes to form continuous active area shapes for each of the nanowire-based devices; (c) expanding the continuous active area shapes to join all of the continuous active area shapes in the design together to form a single polygon shape; (d) removing each of the continuous active area shapes formed in step (b) from the single polygon shape resulting in one or more landing pad shapes for anchoring the nanowire mask shapes; and (e) merging the landing pad shapes with the nanowire mask shapes from step (a) to form the lithographic mask which now includes the nanowire mask shapes and the landing pad shapes for anchoring the nanowire mask shapes.

In another aspect of the invention, another CAD-based method for designing a lithographic mask for nanowire-based devices is provided which includes the steps of: (a) creating a design for the lithographic mask from existing design data, wherein the design includes continuous active area shapes for each of the nanowire-based devices; (b) expanding the continuous active area shapes to join all of the continuous active area shapes in the design together to form a single polygon shape; (c) removing each of the continuous active area shapes from step (a) from the single polygon shape resulting in one or more landing pad shapes; (d) dividing the continuous active shapes from step (a) into one or more nanowire mask shapes; and (e) merging the landing pad shapes with the nanowire mask shapes to form the lithographic mask which now includes the nanowire mask shapes and the landing pad shapes for anchoring the nanowire mask shapes.

A more complete understanding of the present invention, as well as further features and advantages of the present invention, will be obtained by reference to the following detailed description and drawings.

DETAILED DESCRIPTION OF PREFERRED EMBODIMENTS

Figure 8:
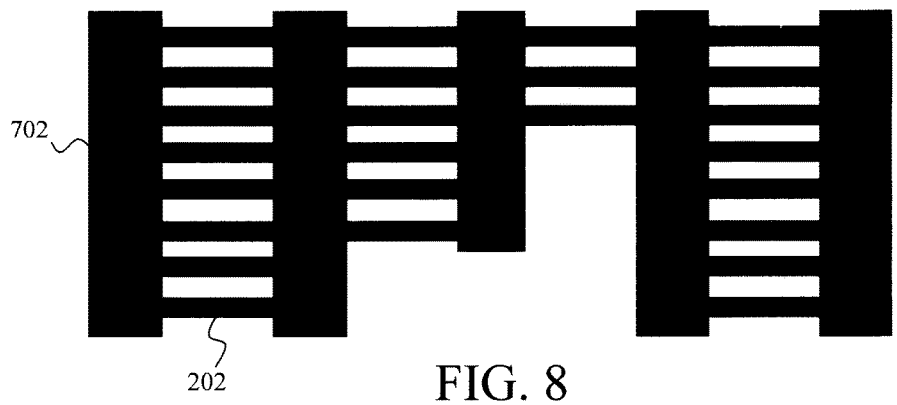
FIG. 8 is a diagram illustrating the landing pad shapes from FIG. 7 having been merged with the discrete active region (nanowire mask) shapes to form a nanowire/landing pad mask design according to an embodiment of the present invention.

As highlighted above, electronic device designs employing freely suspended wires also need landing pads to tether or anchor the wires. One implementation of a nanowire/landing pad design employs a ladder-like configuration wherein both the nanowires and pads are patterned in an active layer of a wafer wherein the nanowires, like the rungs of a ladder, have the pads attached at opposite ends thereof. See, for example, FIG. 8 (described below) which depicts such a ladder-like nanowire and pad configuration.

In implementations involving silicon-on-insulator (SOI) wafers, an SOI layer is the active layer in which the nanowires and pads are patterned. In an SOI wafer, the SOI layer is typically separated from a supporting substrate by a buried oxide (or BOX). To form the device, a hardmask is patterned on the SOI layer with the footprint and location of the nanowires and landing pads. The shape of the patterned hardmask is then transferred to the SOI layer (e.g., using a suitable etching process) and the hardmask may then be removed. Fabrication processes (such as undercutting the BOX) may be used to suspend the nanowires. The result is one or more freely suspended nanowires which are tethered/anchored at their opposite ends by the landing pads. This enables the formation of all-around gate electrodes (e.g., which completely surround at least a portion of each of the nanowires).

The present techniques address the device design process for producing the hardmask that is used to pattern the nanowires and landing pads. More specifically, while the configuration of the nanowires (e.g., number, length, etc.) will likely vary from one device to another, a commonality among all of the devices is that landing pads are needed to tether/anchor the wires if the wires are to be suspended. Advantageously, the present techniques enable designers to use existing device data to automatically generate landing pads for the design. Without such capabilities, conventional computer-aided design (CAD) processes would require that designers manually input data to place each landing pad in the design, which would in most cases be extremely time consuming.

Figure 1:
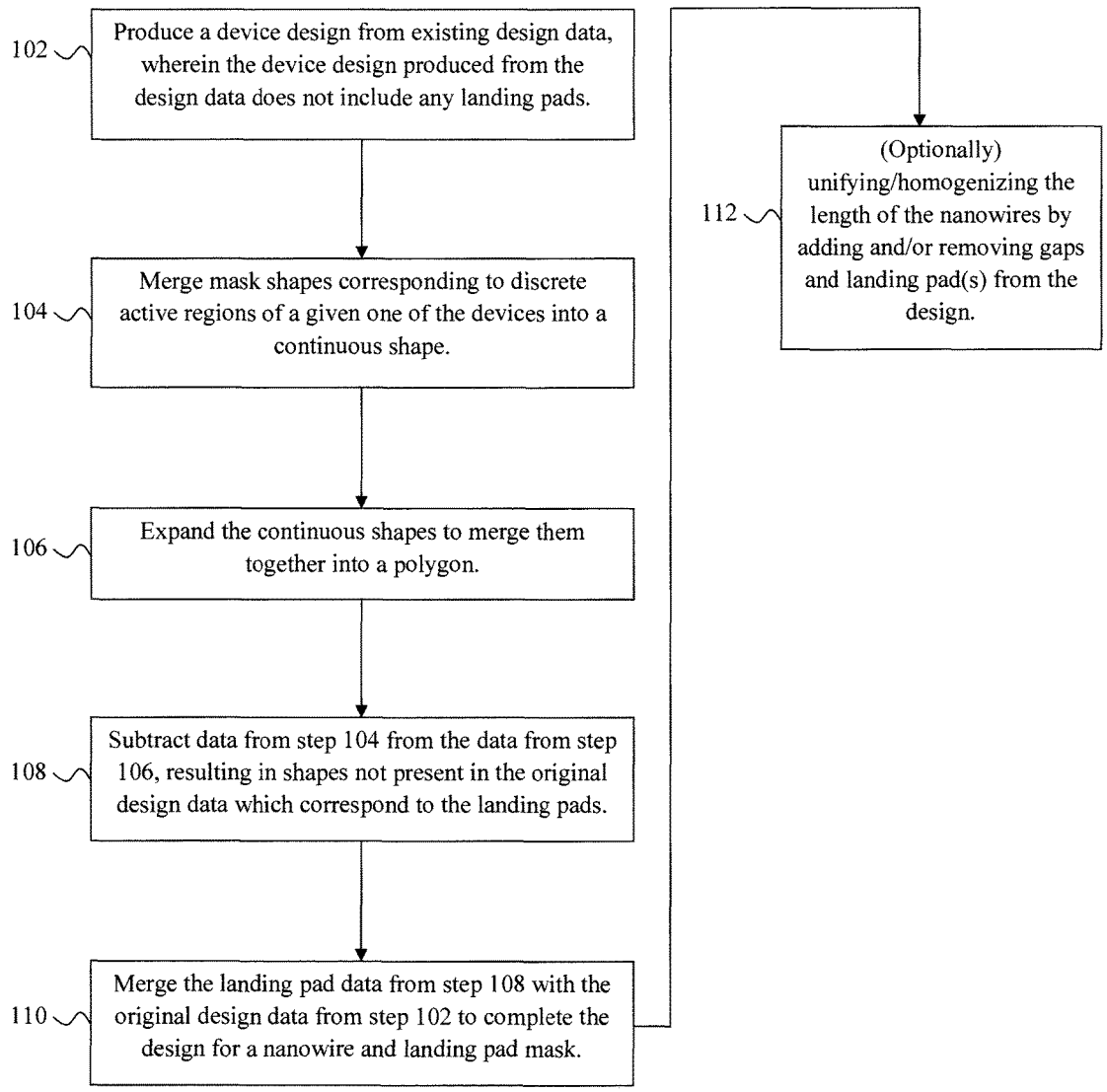
FIG. 1 is a diagram illustrating an exemplary computer-aided design (CAD)-based methodology for designing a lithographic mask for nanowire-based devices by automatically generating landing pad data for an existing FIN field effect transistor (FET) (FINFET) device design according to an embodiment of the present invention.
Figure 2:
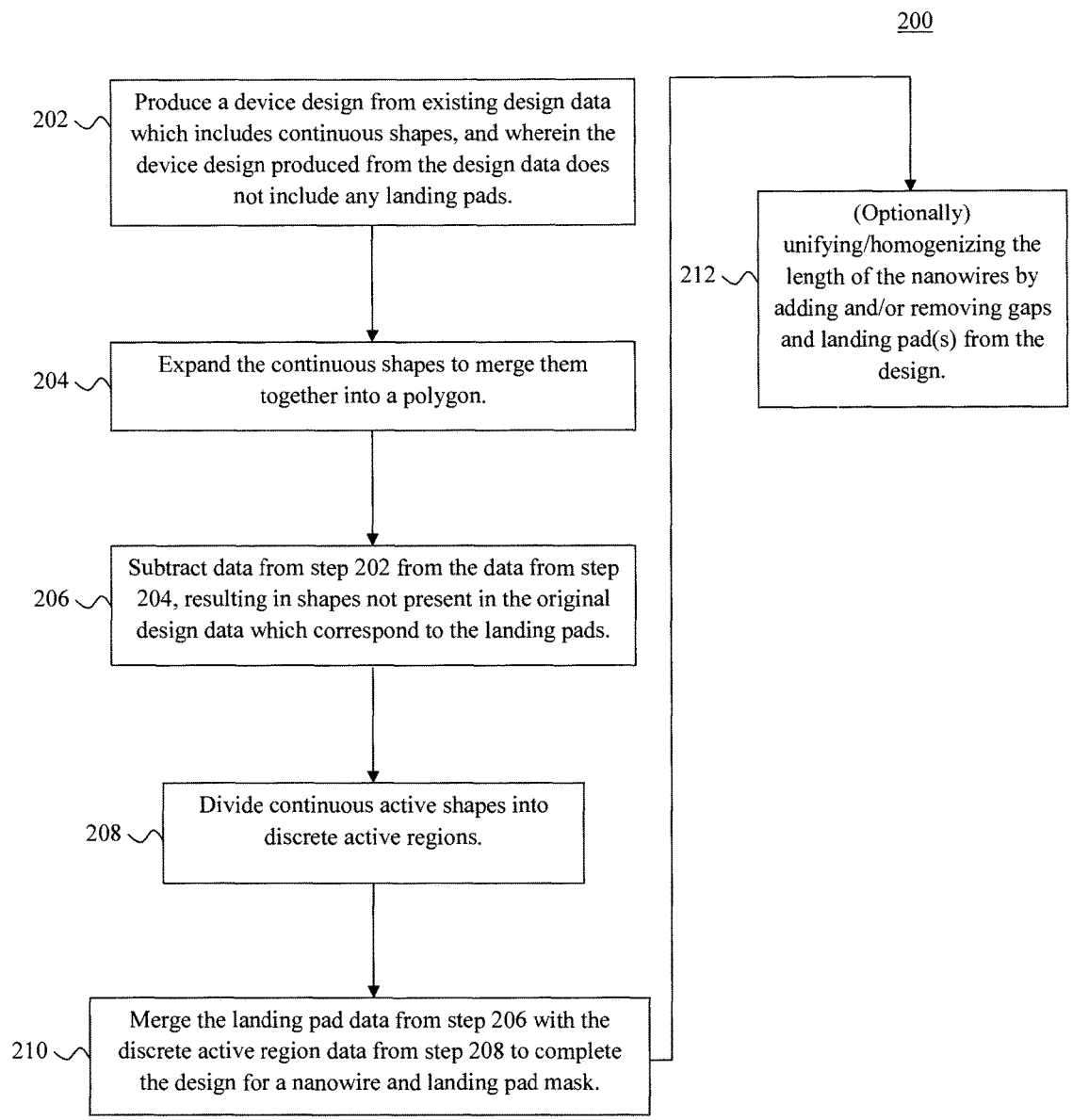
FIG. 2 is a diagram illustrating an exemplary CAD-based methodology for designing a lithographic mask for nanowire-based devices by automatically generating landing pad data for an existing planar complementary metal oxide semiconductor (CMOS) device design according to an embodiment of the present invention.

An overview of the present techniques for designing a lithographic mask for nanowire-based devices which includes automatically generating landing pad data for an existing (non-suspended nanowire—and thus which does not already include landing pads) design is first provided by way of reference to methodology 100 of FIG. 1 (when the existing design is that of a FIN field effect transistor (FIN-FET) device) and methodology 200 of FIG. 2 (when the existing design is that of a planar complementary metal oxide semiconductor (CMOS) device). An exemplary implementation of the present techniques to generate a lithographic mask for patterning a nanowire device structure containing nanowires and pads is described in conjunction with the description of FIGS. 3-15, below.

In general, an objective of the present techniques is to migrate device designs from configurations such as FINFET or planar CMOS devices that do not have suspended structures (and thus do not need or include landing pads) to designs having a suspended nanowire(s), without having to explicitly draw the landing pad regions required by a suspended device (i.e., a nanowire). These landing pads are automatically generated by the present process, thus greatly expediting and simplifying the designing process.

The present techniques may be implemented using any commercially available CAD software which permits a user/designer to alter, configure or in any other way create, manage, and manipulate device design shapes. A suitable CAD software package that may be used to implement the present techniques includes, but is not limited to, Custom Designer® LE, available from Synopsys, Mountain View, Calif. The CAD software may be run, for example, on a computer apparatus, such as apparatus 1300 of FIG. 13—described below.

The steps of the present process and/or the order in which the steps are performed differ slightly depending on the design data with which the process starts. As will be apparent from the description below, when the starting data is for an existing FINFET design, then the design likely includes individual mask shapes corresponding to the fins. Steps are then needed (according to the present process) to merge these individual mask shapes into a continuous (active area) shape so as to be able to determine the location and shape of the pads—see below. On the other hand, when the starting data is for an existing planar CMOS design, then the design already includes a continuous (active area) mask shape for each device. However, since individual mask shapes for the nanowires are needed to merge with the landing pad data (generated according to the present process) to complete the mask design—see below, then an additional step(s) will be needed to divide the (planar CMOS design) continuous shape(s) into discrete active region (nanowire mask) shapes. Thus while the same steps are generally performed for any starting design data, for ease and clarity of description the present process as it pertains to employing starting data for an existing FINFET design is described in conjunction with the description of FIG. 1, below, and the present process as it pertains to employing starting data for an existing planar CMOS design is described in conjunction with the description of FIG. 2, below. In the example that follows in FIGS. 3-15, differences in the steps and/or the order performed are highlighted in the description.

Referring now first to methodology 100 of FIG. 1 which depicts an exemplary embodiment wherein the starting design data includes a plurality of discrete active region shapes for each device to be patterned. Such is the case when the starting design data is for a FINFET device design, wherein the discrete active regions already in the design correspond to individual fins. According to the present techniques, these discrete active region shapes will serve as the nanowire mask shapes in the design. In step 102, based on the starting design data (inputted, e.g., by a user/designer) the CAD program creates an image of the device design. According to an exemplary embodiment, the design data employed in step 102 pertains to a device design that does not include suspended structures (i.e., nanowires) and/or landing pads. Namely, as provided above, one objective of the present techniques is to be able to take existing device data (e.g., data for device designs not involving suspended structures, such as FINFET or planar CMOS design data) and migrate that data into a design including suspended structures (i.e., nanowires) by automatically generating the landing pads needed for anchoring the suspended structures. Thus, the design generated at this point in the process does not include nanowires or landing pads since it is based on data for (existing) devices that do not include these structures.

The term "design data," as used herein generally refers to data that is entered by a designer/user into a CAD program that will eventually result in the generation of a photolithographic mask to be used in semiconductor device processing. As described in detail above, the starting design data (from step 102) in this example is assumed to be for a non-nanowire device design (in this example a FINFET), where nanowires and nanowire landing pad regions would not already exist in the design. It is noted that since the starting design data in this particular example is for a FINFET device, the design is assumed to already include a plurality of discrete active regions corresponding to individual fins (see, for example, FIG. 3—described below) which, as highlighted above, will also serve as the discrete active region (nanowire mask) shapes in the present mask design. Namely, as provided above, the present techniques serve to produce a mask that will be used later in the device fabrication process to pattern the wafer into the active regions of a device(s). With nanowire devices, the nanowires constitute the discrete active regions of a nanowire device that are patterned in the wafer. Thus, a goal of step 102 is to produce a device design with a plurality of discrete active region (nanowire mask) shapes for each device to be patterned. The discrete active region (nanowire mask) shapes will be used to pattern the individual nanowires of the device. It is notable that the landing pads are also considered active regions of a nanowire device. However, in this case, the mask for the pads will be (automatically) added to the design later in the process, and hence not yet present in the design.

At this point in the process, the device design will contain a plurality of shapes which, as described above, correspond to the nanowire mask that will be used to pattern the plurality of discrete active regions in the wafer. More specifically, the mask shapes now present correspond to the nanowires that will be patterned in the wafer. There will be at least one nanowire mask shape for each of the devices in the design. It is to be understood that the present techniques involve transformations of design data relating to, for example, the nanowire mask shapes, continuous active area shapes, pad shapes, etc.—see below, rather than an actual manipulation of physical shapes. Thus, as will be apparent from the description that follows, the pre-transformed shapes will be used later in the process and it is to be understood that any of the shapes created during the process can be stored as a variable or in memory and re-accessed at a later point in the process. Thus, taking the nanowire mask shapes as an example, even though these shapes will be merged in the next step to create a different, continuous active area shape, the original nanowire mask shapes can be re-accessed later in the process and combined, for example, with pad shapes to complete the design.

The next task is to determine the location of the landing pads (necessary to anchor the nanowires) and add them to the design. According to the present process, landing pad mask shapes are automatically generated in the design using the existing design data (i.e., they do not have to be manually drawn by the designer). To automatically generate the landing pad mask shapes in the design, first in step 104 the (nanowire) mask shapes corresponding to the discrete active regions for a given device are merged into a continuous (active area) shape. This is done for each nanowire device in the design. As highlighted above, when the starting data is for an existing planar CMOS design (rather than, e.g., a FINFET), then the design already includes continuous (active area) mask shapes for each device, and this merging step is not needed (compare with methodology 200 of FIG. 2—described below).

According to an exemplary embodiment, the (nanowire) mask shapes corresponding to the discrete active regions of a device are merged using a transform that expands the nanowire mask shapes by a constant amount, until they merge (union) with one another—forming a merged shape for each of the devices, and then shrinking the resultant, merged shape to the initial outline of the original group of discrete active regions/nanowire mask shapes thus forming a continuous shape for each device. An exemplary process for merging the discrete active region (nanowire mask) shapes for a given device into a continuous shape is described in conjunction with the description of FIG. 11, below. It is notable that the present process would apply, in the same manner described, to a single nanowire device. The key is that in step 104, if there is a single fin/nanowire mask shape, the shape is expanded, then shrunk, leaving the original shape there. Thus in the case of single nanowire device designs, the nanowire is merged with zero additional nanowires. Accordingly, nanowire-based device designs are also considered herein wherein one or more of the devices contain only a single nanowire.

In step 106, the continuous (active area) shapes (created for each device in step 104) are then expanded to join them together (i.e., to join all of the continuous (active area) shapes in the design together). Step 106 is performed to eliminate the spaces between adjacent continuous (active area) shapes (from step 104) so as to form a single, polygon shape. The same general merging process used to merge the discrete active regions into the continuous shapes (see FIG. 11—described below) can also be used to merge the continuous (active area) shapes into a single polygon as per step 106. The only difference here is that either the expand or the shrink function is selectively performed in the x- or y-direction, respectively. Specifically, using the same merging process, in one exemplary embodiment a transform is used that expands the continuous (active area) shapes by a constant amount X selectively in the x-direction until they merge (union) with one another—forming a merged shape.

A shrinking step is then not needed. Alternatively, in another exemplary embodiment a transform is used that expands the continuous (active area) shapes by a constant amount X (uniformly in both x- and y-directions) until they merge (union) with one another—forming a merged shape. A shrinking of the resultant, merged shape is then performed selectively in the y-direction down to the initial height of the original group of continuous (active area) shapes thus forming the single polygon.

The goal here is to be able to determine where the landing pads (not present in the original design data) should be placed in the new nanowire-based design. Thus, in step 108, the data (the continuous (active area) shapes for each of the devices from step 104 (i.e., that data known and/or derived from the starting design data)) is subtracted/removed from the data from step 106 (i.e., data relating to the single merged polygon), resulting in shapes not present in the original design data which correspond to the landing pads, i.e., landing pad shapes for anchoring the nanowire mask shapes. A simple geometric shape subtraction may be used to perform step 108.

Again, the purpose of the present process is to create a lithography mask for patterning nanowires and corresponding landing pads in a wafer. Thus in step 110, the landing pad data from step 108 (i.e., the landing pad shapes) is merged with the original design data from step 102 (i.e., the nanowire mask shapes) to complete the design for a nanowire and landing pad mask. A simple union of data process may be used to perform step 110. The data can then be input into a mask writer for the creation of a mask that will form the active silicon region in a nanowire FET fabrication process. As highlighted above, when the starting data is for an existing planar CMOS design (rather than, e.g., a FINFET), an additional step is needed to generate the discrete active region (nanowire mask) shapes—i.e., from the continuous (active area) mask shapes—for the purpose of merging with the landing pad data to complete the mask design. This aspect of planar CMOS design data is described in conjunction with the description of methodology 200 of FIG. 2, below.

Following creation of the nanowire and landing pad mask design, it may be desirable to make changes to the design, such as to optimize the design by unifying/homogenizing the length of the nanowires. Uniform length wires are desirable from a design for manufacturability standpoint—less susceptible to process variations as well as the minimization of device performance variations due to nanowire length-dependent effects such as stress or nanowire sagging. This optimization is (optionally) performed in step 112. Namely, gaps (and corresponding landing pads within the gaps to anchor the ends of the nanowires) are used between adjacent devices. By adding and/or removing one or more gaps/landing pad mask shapes from the design, the length of the nanowire mask shapes therebetween can be decreased and/or increased, respectively. Thus, longer or shorter length nanowires can (optionally) be decreased or increased to match the shorter or longer length of their counterpart devices on the wafer. An exemplary process for unifying the length of the nanowires by inserting gaps/pads is described in detail in conjunction with the description of FIG. 10, below, and an exemplary process for unifying the length of the nanowires by removing gaps/pads is described in detail in conjunction with the description of FIG. 12, below.

For comparison, an implementation of the present techniques beginning with planar CMOS design data is now provided by way of reference to methodology 200 in FIG. 2. In step 202, based on (in this case planar CMOS) design data (inputted, e.g., by a user/designer) the CAD program creates an image of the device design. As above, the initial input/existing design data employed in step 202 pertains to a device design that does not include suspended structures (i.e., nanowires) and/or landing pads. Thus, the design generated at this point in the process does not include nanowires or landing pads since it is based on data for (existing) devices that do not include these structures. Since the initial input data for a planar CMOS design is assumed to include continuous active area shapes (i.e., as opposed to individual fin/nanowire masks), the process then proceeds to expand these continuous active shapes to merge them into a polygon. It is however noted that an additional step is needed to divide the continuous active shapes into discrete active region (nanowire mask) shapes (i.e., the opposite process to that described in terms of the FINFET embodiment) as described below—but which could be performed at any point in the process.

Namely, in step 204, the continuous active area shapes are then expanded to join them together (i.e., to join all of the continuous active area shapes in the design together). As above, step 204 is performed to eliminate the spaces between adjacent continuous shapes in the design so as to form a single, polygon shape. According to an exemplary embodiment, the same general above-described merging process is used to merge the continuous shapes into a single polygon in step 204. The only difference here is that either the expand or the shrink function is selectively performed in the x- or y-direction, respectively. Specifically, using the same merging process, in one exemplary embodiment a transform is used that expands the continuous (active area) shapes by a constant amount X selectively in the x-direction until they merge (union) with one another—forming a merged shape. A shrinking step is then not needed. Alternatively, in another exemplary embodiment a transform is used that expands the continuous (active area) shapes by a constant amount X (uniformly in both x- and y-directions) until they merge (union) with one another—forming a merged shape. A shrinking of the resultant, merged shape is then performed selectively in the y-direction down to the initial height of the original group of continuous (active area) shapes thus forming the single polygon.

The goal here is to be able to determine where the landing pads (not present in the original design data) should be placed in the new nanowire-based design. Thus, in step 206, the continuous shapes for each of the devices from step 202 (i.e., that data known from the starting design data)) are subtracted/removed from the data from step 204 (i.e., data relating to the single merged polygon), resulting in shapes not present in the original design data which correspond to the landing pads, i.e., landing pad shapes for anchoring the nanowire mask shapes. A simple geometric shape subtraction may be used to perform step 206.

Again, the purpose of the present process is to create a lithography mask for patterning nanowires and corresponding landing pads in a wafer. In this example, the initial (planar CMOS design) data is assumed not to have included mask shapes (discrete active area regions) corresponding to individual nanowires/fins. Thus, it is necessary at this (or any prior) point to divide the continuous active area shapes from the original (planar CMOS) design data into a plurality of discrete active region (nanowire mask) shapes. In the exemplary flow of methodology 200, this is now performed in step 208. In step 208, the continuous active area shapes of the device design are converted into a plurality of discrete active regions, i.e., the discrete active regions corresponding to the mask shapes for nanowires or fins. An exemplary process, involving a look-up table approach, for converting continuous active area shapes to multiple discrete active regions is described in conjunction with the description of FIG. 9, below.

The remainder of the process is the same as that described in FIG. 1 above for migrating from a FINFET design. Namely, in step 210, the landing pad data from step 206 (i.e., the landing pad shapes) is merged with the discrete active region (nanowire mask) shapes from step 208 to complete the design for a nanowire and landing pad mask. A simple union of data process may be used to perform step 210. The data can then be input into a mask writer for the creation of a mask that will form the active silicon region in a nanowire FET fabrication process.

Following creation of the nanowire and landing pad mask design, it may be desirable to make changes to the design, such as to optimize the design by unifying/homogenizing the length of the nanowires. Uniform length wires are desirable from a design for manufacturability standpoint—less susceptible to process variations as well as the minimization of device performance variations due to nanowire length-dependent effects such as stress or nanowire sagging. This optimization is (optionally) performed in step 212. Namely, gaps (and corresponding landing pads within the gaps to anchor the ends of the nanowires) are used between adjacent devices. By adding and/or removing one or more gaps/landing pad mask shapes from the design, the length of the nanowire mask shapes therebetween can be decreased and/or increased, respectively. Thus, longer or shorter length nanowires can (optionally) be decreased or increased to match the shorter or longer length of their counterpart devices on the wafer. An exemplary process for unifying the length of the nanowires by inserting gaps/pads is described in detail in conjunction with the description of FIG. 10, below, and an exemplary process for unifying the length of the nanowires by removing gaps/pads is described in detail in conjunction with the description of FIG. 12, below.

An exemplary implementation of the above-described process is now provided by way of reference to FIGS. 3-15. In this example, the present techniques will be employed to generate nanowire and landing pad (lithography mask) data from existing FINFET or planar CMOS design data for a plurality of devices to be formed adjacent to one another on a wafer. Adjacent devices are distinguishable from one another based on differences in width, number of fins/nanowires, etc., and are preferably separated by gaps.

Figure 3:
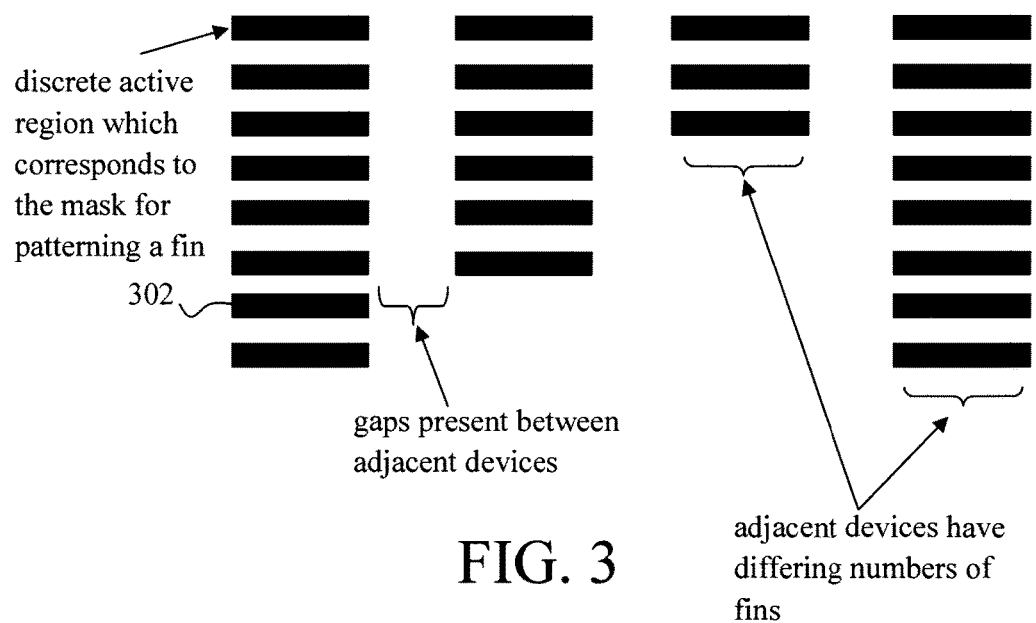
FIG. 3 is a diagram illustrating a device design for a FINFET device created from existing design data which includes a plurality of discrete active region (fin mask) shapes according to an embodiment of the present invention.

First, existing design data (input, e.g., by a user/designer into a CAD program) is used to create an image of the device design. See for example step 102 of methodology 100 and step 202 of methodology 200 in FIGS. 1 and 2, respectively. As described above, the existing design data is directed to a device design that does not include suspended nanowires. For instance, the existing design data is directed to FINFET (see FIG. 3) or a planar CMOS (see FIG. 4) device design. Thus, the lithography mask shapes created using the existing design data will not have landing pads. The example shown in FIG. 3 pertains to existing design data for a FINFET device. As shown in FIG. 3, the mask design already includes a plurality of discrete active regions 302, each of which corresponds to patterning a fin. These discrete active regions 302 will, in this example, correspond to the mask shapes used to pattern nanowires on the wafer (i.e., nanowire mask shapes).

Also, as illustrated in FIG. 3, adjacent devices can be distinguished based on differences in width, number/length of nanowires/fins, etc. In this particular example, adjacent devices have differing numbers of fins. Also, as illustrated in FIG. 3, adjacent devices in the present design are separated by gaps.

Referring first to the case (illustrated in FIG. 3) of migrating from a FINFET design, what is now present is a device design having a plurality of discrete shapes 302 which corresponds to the mask that will be used to pattern the plurality of discrete active regions for a device(s) in the wafer. More specifically, the mask shapes now present correspond to the nanowires that will be patterned in the wafer, and there is at least one nanowire mask shape for each of the nanowire devices to be formed on the wafer.

Figure 4:
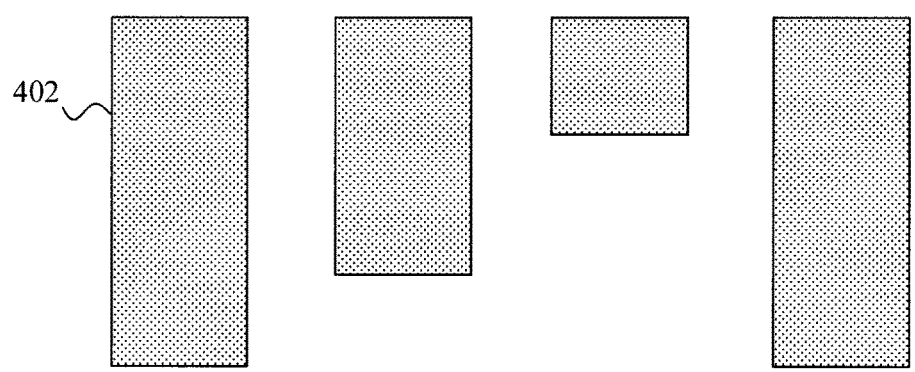
FIG. 4 is a diagram illustrating a device design for a planar CMOS device created from existing design data or the result of merging the discrete active region (fin mask) shapes of the FINFET device design (of FIG. 3) into a continuous (active area) shape for each nanowire-based device according to an embodiment of the present invention.
Figure 11:
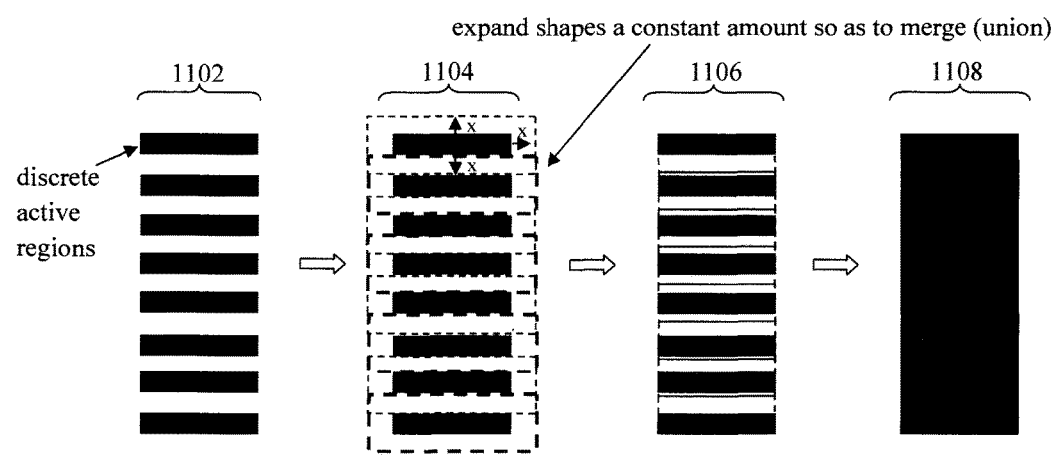
FIG. 11 is a schematic diagram illustrating an exemplary methodology for merging the discrete active region (nanowire mask) shapes for a given device into a continuous (active area) shape according to an embodiment of the present invention.

Following from FIG. 3, as illustrated in FIG. 4 the process of (automatically) adding landing pads to the design begins by merging the mask shapes corresponding to the discrete active regions for a given device into a continuous (active area) shape 402. See, for example, step 104 of methodology 100 in FIG. 1. This is done for each nanowire device in the design. This step may be performed using a transform that performs expand/union/shrink operations to merge the discrete active region (nanowire mask) shapes for each device. This merging process is described in further detail by way of reference to FIG. 11. Specifically, as shown in FIG. 11, the merging process begins in step 1102 with the plurality of discrete active regions which correspond to fins in the starting FINFET design data and to the nanowires in the present design. A transform is then used in step 1104 to expand the design data (from step 1102) by a constant amount until each shape contacts the adjacent shape so that the shapes merge, merging (union) the former discrete active region shapes into a fewer resultant merged shapes. The dashed lines in FIG. 11 are used to show how in step 1104 the distinct active region (nanowire mask) shapes are expanded a constant amount X until the shapes merge. Alternating lighter and darker dashed lines are employed in FIG. 11 solely to distinguish the expansion of each shape from that of the adjacent shape(s). Thus, e.g., as shown in step 1104 of FIG. 11 the top most discrete active region is expanded by a constant amount X until it contacts the adjacent active region—which is the second discrete active region from the top. This expansion of the top most discrete active region is indicated by a lighter dashed line. In the same manner, the second discrete active region from the top is expanded by a constant amount X until it contacts the adjacent active regions—which are top most discrete active region and the third discrete active region from the top. This expansion of the second discrete active region from the top is indicated by a darker dashed line, and so on. Next, in step 1106, the merged shape (from step 1104) is then shrunk so that it will have the same outline as the initial group of shapes from step 1102. The result, as shown in step 1108 is a continuous (active area) shape. By way of example only, in code, the expand/union/shrink operations of steps 1102-1108 may be: expand by X, union abutting/overlapping shapes, shrink by X, where X is a value equal to or greater than the small gap between the initial shapes in step 1102.

By comparison, a planar CMOS device design would already include continuous active area shapes. Thus, the above-described fin/discrete active area merging step is not needed, and the process may begin with the step illustrated in FIG. 4. However, in the case of planar CMOS design data, the continuous (active area) shapes will at some point in the process have to be divided into discrete active region (nanowire mask) shapes to complete the mask design—see above.

Figure 5:
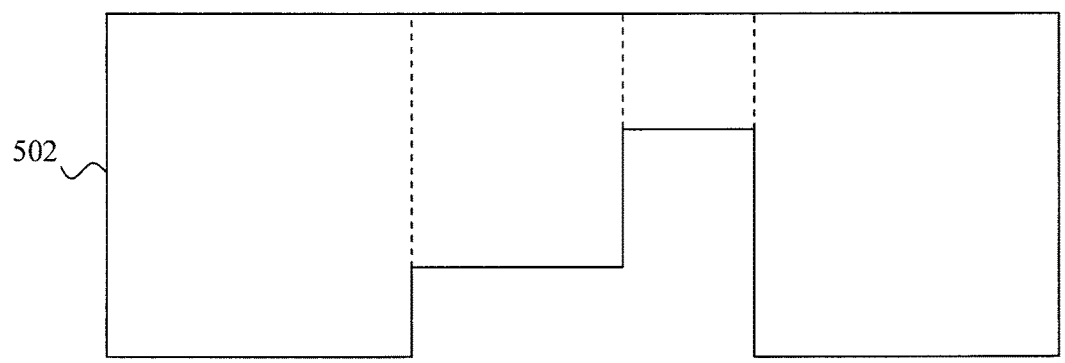
FIG. 5 is a diagram illustrating the continuous (active area) shapes created for each nanowire-based device (from FIG. 4) having been expanded to join them together into a single polygon shape according to an embodiment of the present invention.
Figure 6:
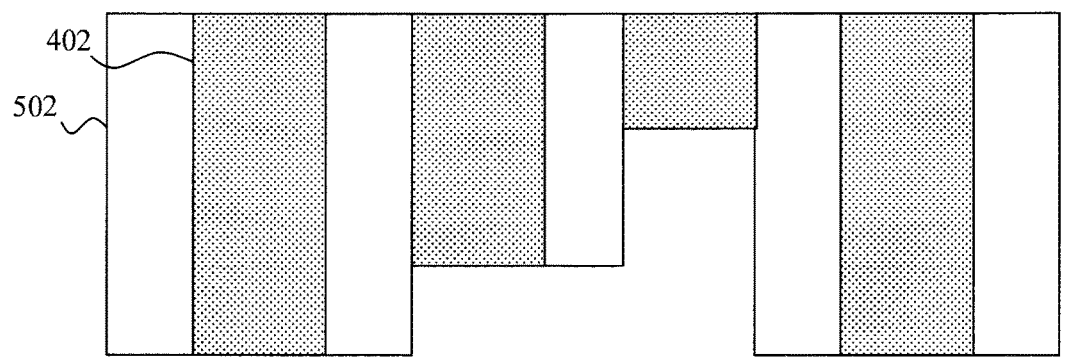
FIG. 6 is a diagram illustrating the continuous shapes of FIG. 4 having been subtracted/removed from the polygon shape of FIG. 5 according to an embodiment of the present invention.

In both the FINFET and planar CMOS design scenarios, the next step as illustrated in FIG. 5 is to expand the continuous shapes from FIG. 4 to join them together into a single polygon shape. See, for example, step 106 of methodology 100 and step 204 of methodology 200 in FIGS. 1 and 2, respectively. This is done to eliminate the spaces between the continuous (active area) shapes (of FIG. 4) adjacent to one another—corresponding to adjacent devices on the wafer—so as to form a single, polygon shape 502. The same general merging process described in conjunction with the description of FIG. 11, above, may also be used here except in this case the merging steps are performed to eliminate the gaps between the continuous shapes in FIG. 4 to produce one polygon 502. As described above, the only difference here is that either the expand or the shrink function is selectively performed in the x- or y-direction, respectively. Specifically, using the same merging process, in one exemplary embodiment a transform is used that expands the continuous (active area) shapes by a constant amount X selectively in the x-direction until they merge (union) with one another—forming a merged shape. A shrinking step is then not needed. See, for example, FIG. 14.

Figure 14:
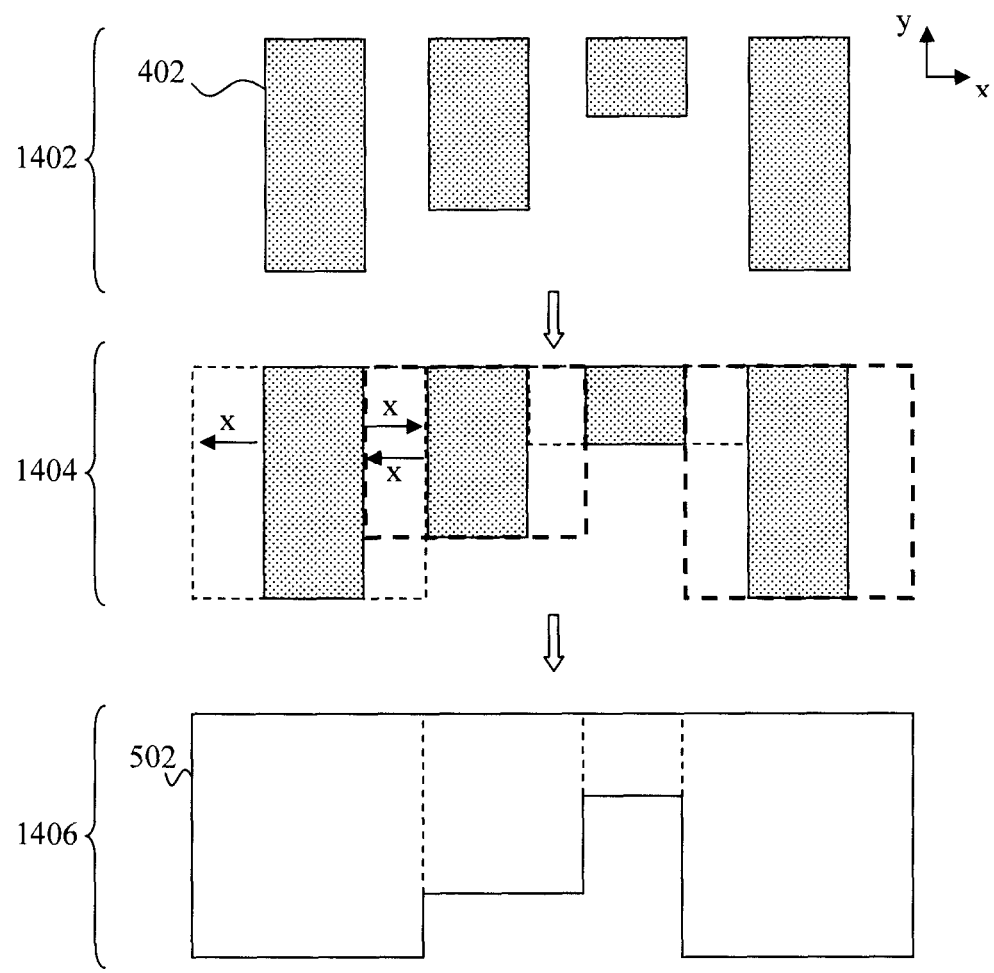
FIG. 14 is a diagram illustrating an exemplary methodology for merging continuous (active area) shapes into a single polygon shape according to an embodiment of the present invention.

Specifically, as shown in FIG. 14, the merging process begins in step 1402 with the continuous (active area) shapes 402 from FIG. 4. A transform is then used in step 1404 to expand each of the continuous (active area) shapes 402 by a constant amount X selectively in the x-direction until each shape contacts the adjacent shape and they merge (union) with one another in the x-direction—forming the single polygon in step 1406. The dashed lines in FIG. 14 are used to show how in step 1404 the continuous (active area) shapes 402 are expanded by a constant amount X in the x-direction until the shapes merge. Alternating lighter and darker dashed lines are employed in FIG. 14 solely to distinguish the expansion of each shape from that of the adjacent shape(s). Thus, e.g., as shown in step 1404 of FIG. 14 the left most continuous (active area) shape is expanded by a constant amount X in the x-direction until it contacts the adjacent continuous (active area) shape—which is the second continuous (active area) shape from the left. This expansion of the left most continuous (active area) shape is indicated by a lighter dashed line. In the same manner, the second continuous (active area) shape from the left is expanded by a constant amount X in the x-direction until it contacts the adjacent continuous (active area) shapes—which are left most continuous (active area) shape and the third continuous (active area) shape from the left. This expansion of the second continuous (active area) shape from the left is indicated by a darker dashed line, and so on. An expansion only in the x-direction can be easily specified in the method as the x- and y-coordinates of all shapes are known, and basically amounts to not changing the y-datapoints of the shape. The result, as shown in step 1406 is a single polygon shape (i.e., the polygon 502 of FIG. 5).

Alternatively, using the same general merging process, in another exemplary embodiment a transform is used that expands the continuous (active area) shapes by a constant amount X (uniformly in both x- and y-directions) until they merge (union) with one another—forming a merged shape. A shrinking of the resultant, merged shape is then performed selectively in the y-direction down to the initial height of the original group of continuous (active area) shapes thus forming the single polygon. See, for example, FIG. 15.

Figure 15:
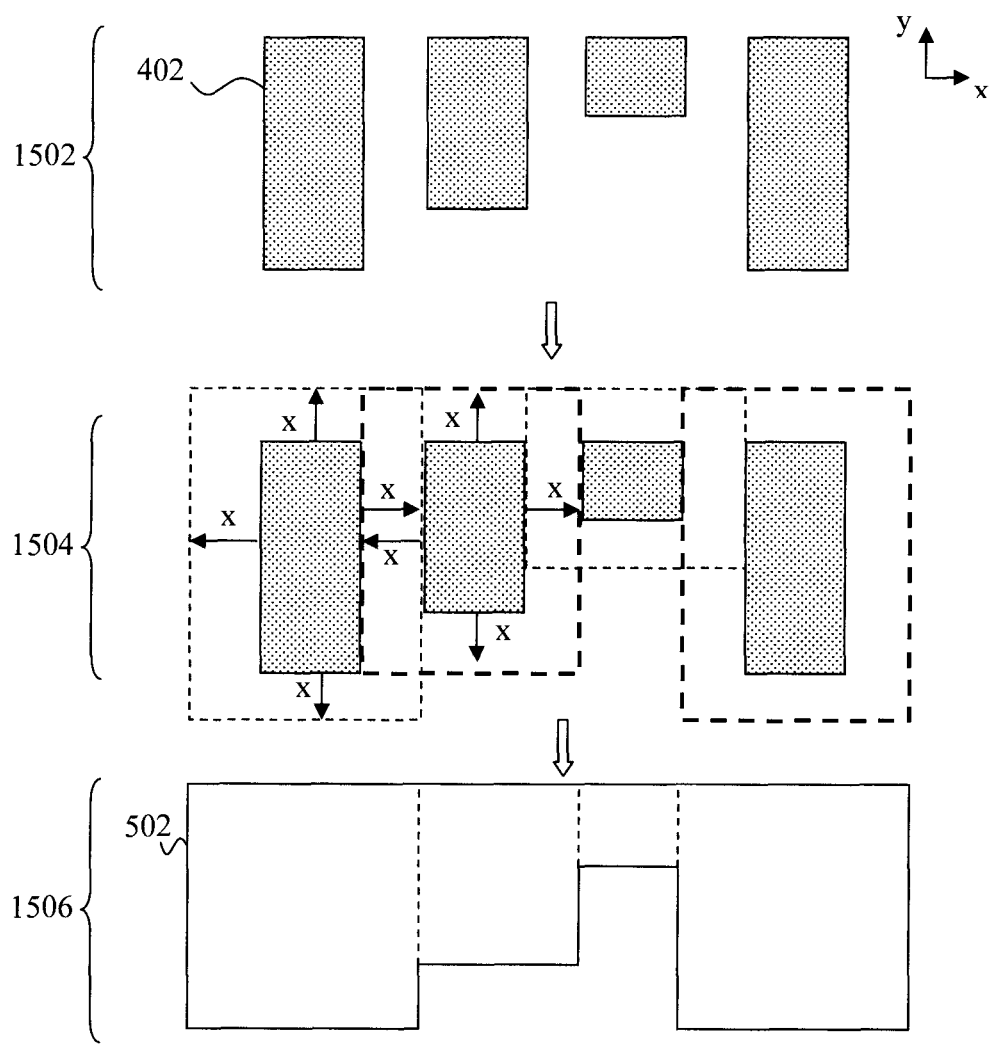
FIG. 15 is a diagram illustrating another exemplary methodology for merging continuous (active area) shapes into a single polygon shape according to an embodiment of the present invention.

Specifically, as shown in FIG. 15, the merging process begins in step 1502 with the continuous (active area) shapes 402 from FIG. 4. A transform is then used in step 1504 to expand each of the continuous (active area) shapes 402 by a constant amount X (uniformly in both x- and y-directions) until each shape contacts the adjacent shape and they merge (union) with one another—forming a merged shape in step 1504. The dashed lines in FIG. 15 are used to show how in step 1504 the continuous (active area) shapes 402 are expanded by a constant amount X in the x- and y-directions until the shapes merge. Alternating lighter and darker dashed lines are employed in FIG. 15 solely to distinguish the expansion of each shape from that of the adjacent shape(s). Thus, e.g., as shown in step 1504 of FIG. 15 the left most continuous (active area) shape is expanded by a constant amount X in the x- and y-directions until it contacts the adjacent continuous (active area) shape—which is the second continuous (active area) shape from the left. This expansion of the left most continuous (active area) shape is indicated by a lighter dashed line. In the same manner, the second continuous (active area) shape from the left is expanded by a constant amount X in the x- and y-directions until it contacts the adjacent continuous (active area) shapes—which are left most continuous (active area) shape and the third continuous (active area) shape from the left. This expansion of the second continuous (active area) shape from the left is indicated by a darker dashed line, and so on. Finally, in step 1506, a shrinking of the resultant, merged shape is then performed selectively in the y-direction down to the initial height of the original group of continuous (active area) shapes thus forming a single polygon (i.e., the polygon 502 of FIG. 5).

Next, referring back to FIG. 6, in order to determine where the landing pads (not present in the original design data) should be placed in the new nanowire-based design, the continuous (active area) shapes of FIG. 4 (i.e., data known or derived from the existing design data) are subtracted/removed from the single merged polygon of FIG. 5 using, for example, geometric shape subtraction. See, for example, step 108 of methodology 100 and step 206 of methodology 200 in FIGS. 1 and 2, respectively. The results of this difference operation are the landing pad shapes 702 shown in FIG. 7.

Again, it is at this point where the FINFET and planar CMOS design scenarios differ. Namely, with FINFET design data the discrete active region (nanowire mask) shapes are already present in the design as they pertain to the location of fins. By comparison, when migrating from a planar CMOS design, these discrete active are not present and need to be derived from the design data. To do so, each of the continuous active area shapes is divided into discrete active regions. See, for example, step 208 of methodology 200 in FIG. 2. This process is described further in FIG. 9.

Figure 9:
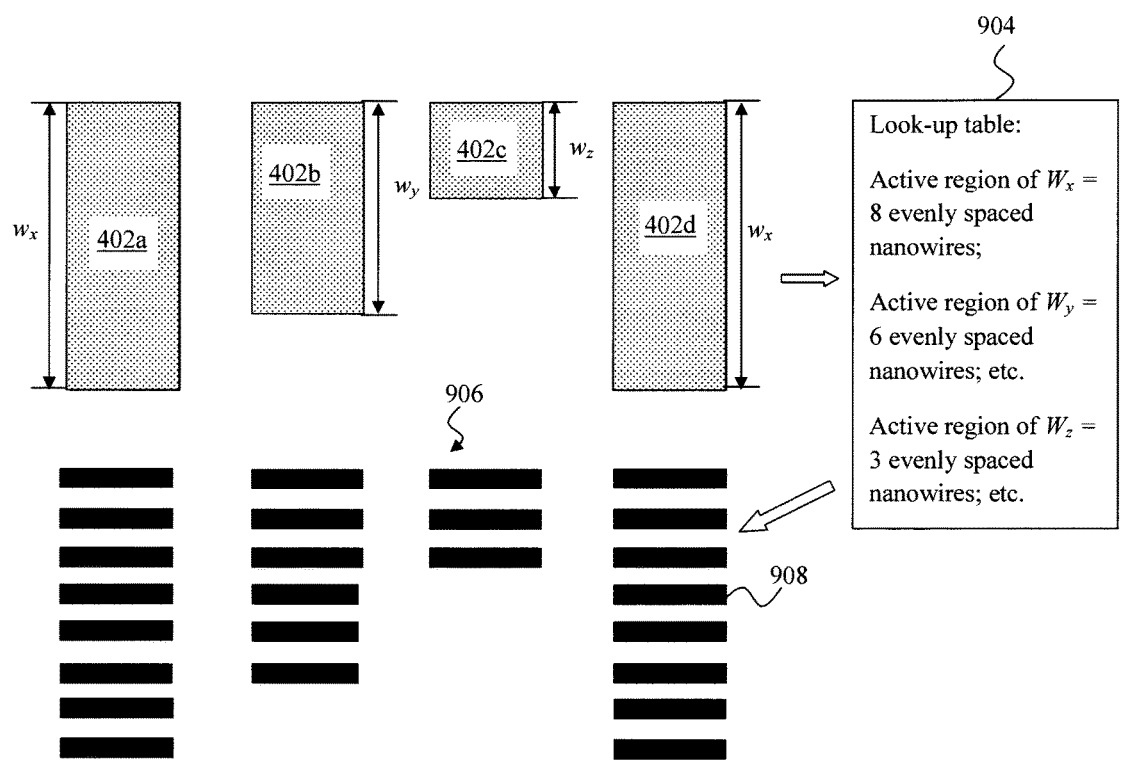
FIG. 9 is a schematic diagram illustrating an exemplary methodology for dividing continuous (active area) shapes into discrete active region (nanowire mask) shapes according to an embodiment of the present invention.

As shown in FIG. 9, the process begins with the continuous active area shapes 402 from FIG. 4 (i.e., the starting point of the process in the case of a planar CMOS design—see above), each of which is (for clarity) here given the designation 402a, 402b, 402c, 402d, etc. According to the exemplary embodiment illustrated in FIG. 9, a look up table approach is used to translate active width size (e.g., the width of each continuous active area 402a, 402b, 402c, 402d, etc. in the planar CMOS design) to a given number of nanowires. For instance, a look up table 904 might be employed which indicates that an active area of width $W_x$ translates to an N1 number of evenly spaced nanowires (where in this example N1=8), an active area of width $W_y$ translates to a N2 number of evenly spaced nanowires (where in this example N2=6), an active area of width $W_z$ translates to a N3 number of evenly spaced nanowires (where in this example N3=3) and so on. Alternatively, it is also possible for a user/designer to redraw continuous active area shapes as multiple discrete active regions. Either way, the result is the active areas 402a, 402b, 402c, 402d, etc.

having been converted into a design 906 containing a plurality of (evenly spaced) discrete active regions 908 corresponding to fin/nanowire mask shapes. Note that design 906 resembles that which is already present in the case of a FINFET design. See FIG. 3.

Figure 7:
FIG. 7 is a diagram illustrating the landing pad shapes that result from the difference operation of FIG. 6 according to an embodiment of the present invention.

Referring back to FIG. 8, to complete the nanowire/landing pad mask design, the landing pad shapes 702 shown in FIG. 7 are merged with either i) in the FINFET scenario—the discrete active region (fin mask) shapes 302 shown in FIG. 3 or ii) in the planar CMOS scenario—the discrete active region (nanowire mask) shapes 908 derived from the design data. See, for example, step 110 of methodology 100 in FIG. 1 or step 210 of methodology 200 in FIG. 2, respectively. A simple union of data process may be used to merge the landing pad and nanowire mask shape data. The data from FIG. 8 can then be input into a mask writer for the creation of a mask that will form the active silicon region in a nanowire FET fabrication process.

Prior to creating the mask, some additional (optional) processing of the nanowire/landing pad mask design may be performed. By way of example only, changes may be made to optimize the design by unifying the length of the nanowires. See, for example, step 112 of methodology 100 in FIG. 1 and step 212 of methodology 200 in FIG. 2. For instance, adding and/or removing one or more gaps/landing pad mask shapes from the design can be used to decrease/increase, respectively, the length of the nanowire mask shapes therebetween. Thus, longer or shorter length nanowires can (optionally) be decreased or increased to match the shorter or longer length of their counterpart devices on the wafer.

Figure 10:
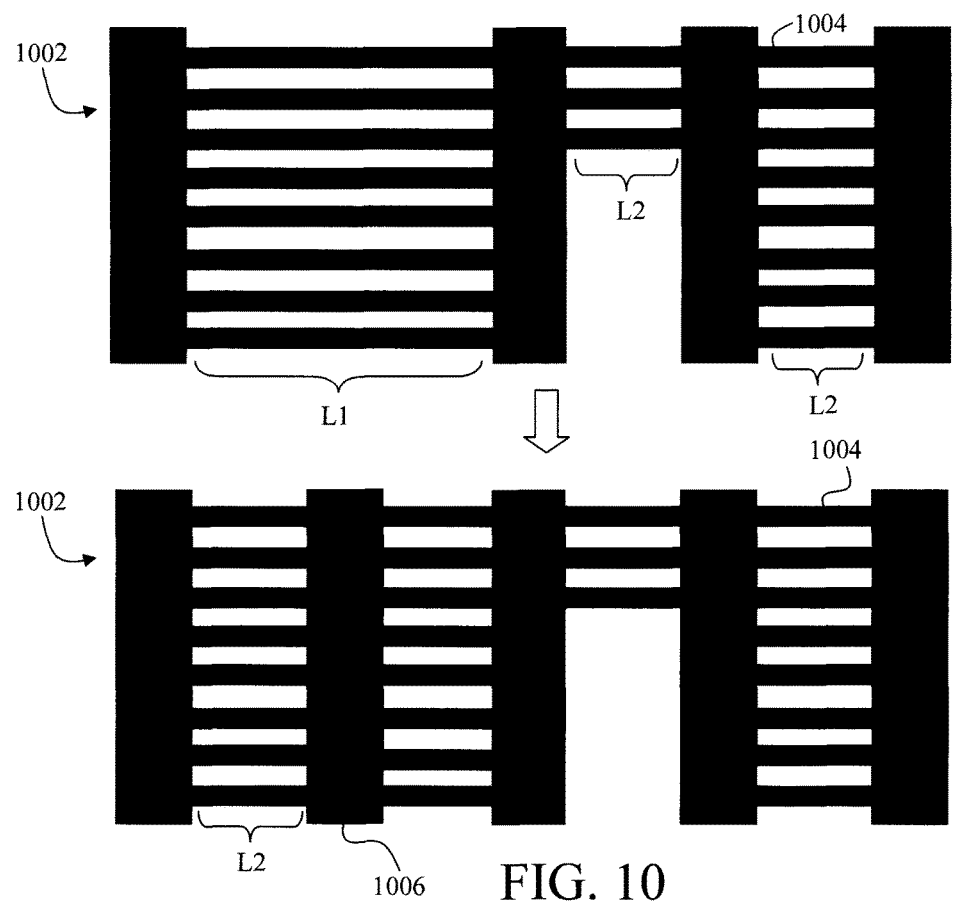
FIG. 10 is a schematic diagram illustrating an exemplary methodology for unifying nanowire mask shape lengths by introducing a pad(s) into the design according to an embodiment of the present invention.

Specifically, while in the examples described above the nanowires were depicted as having the same length, processing of the design in the manner described might result in nanowires having differing lengths. See FIG. 10. FIG. 10 is a diagram illustrating an exemplary process for unifying the length of the nanowires by inserting gaps/pads. As shown in FIG. 10, the design 1002 created using methodology 100 (FIG. 1) or methodology 200 (FIG. 2) actually contains discrete active region (nanowire mask) shapes 1004 of differing lengths, i.e., L1, L2, etc. The longer length (e.g., L1) nanowire masks in the design can be shortened to match their shorter length (e.g., L2) counterparts. This modification can be made by simply inserting a pad 1006 into the design. See FIG. 10. The pad 1006 can be introduced into the design by the designer or automatically by a design automation tool. The resulting design will then have nanowire masks with a common length (e.g., L2).

Figure 12:
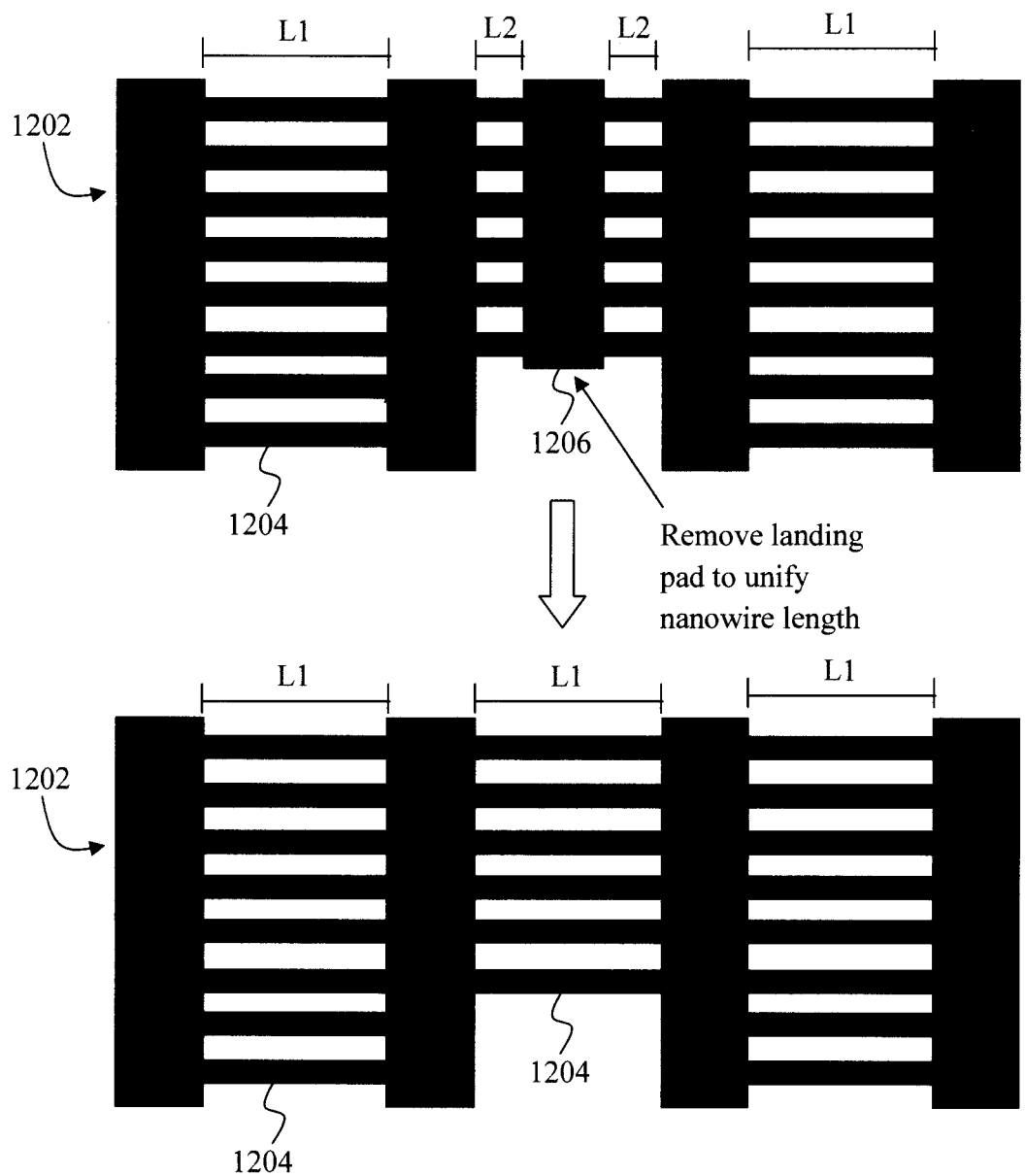
FIG. 12 is a schematic diagram illustrating an exemplary methodology for unifying nanowire mask shape lengths by removing one or more of the landing pads (and corresponding gaps) from the design according to an embodiment of the present invention.

Alternatively to (or in combination with) adding landing pads to the design, nanowire mask lengths can also be unified by removing one or more pads from the design, i.e., so as to lengthen the wires therebetween. This process is illustrated in FIG. 12. Namely, as shown in FIG. 12, the resulting mask design 1202 in the example illustrated has discrete active region (nanowire mask) shapes 1204 of differing lengths L1, L2, etc. To homogenize the length of the discrete active region (nanowire mask) shapes 1204, one or more of the landing pads shapes 1206 (and correspond gap between adjacent devices) can be removed as shown in FIG. 12. As a result, the discrete active region (nanowire mask) shapes 1204 now all have a uniform length L1. As described above, a uniform nanowire length is desirable from a design for manufacturability standpoint as this design is less susceptible to process variations and device performance variations. It is notable that while FIG. 12 illustrates this gap/landing pad shape removal process being used to unify the nanowire length throughout the entire mask design, this is not a requirement. The gaps and landing pads may be selectively removed to unify the nanowire length among any two (or more) devices in the design.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
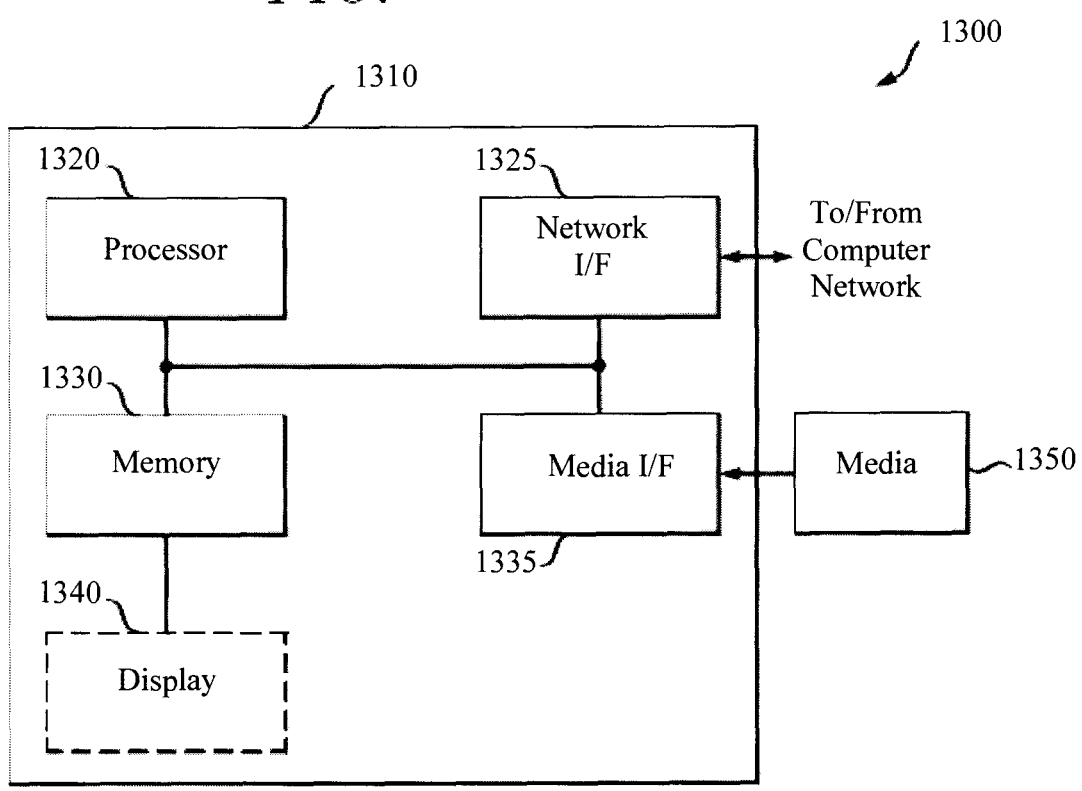
FIG. 13 is a diagram illustrating an exemplary apparatus for performing one or more of the methodologies presented herein according to an embodiment of the present invention.

Turning now to FIG. 13, a block diagram is shown of an apparatus 1300 for implementing one or more of the methodologies presented herein. By way of example only, apparatus 1300 can be configured to implement one or more of the steps of CAD-based methodology 100 of FIG. 1 and/or CAD-based methodology 200 of FIG. 2 for designing a lithographic mask for nanowire-based devices.

Apparatus 1300 includes a computer system 1310 and removable media 1350. Computer system 1310 includes a processor device 1320, a network interface 1325, a memory 1330, a media interface 1335 and an optional display 1340. Network interface 1325 allows computer system 1310 to connect to a network, while media interface 1335 allows computer system 1310 to interact with media, such as a hard drive or removable media 1350.

Processor device 1320 can be configured to implement the methods, steps, and functions disclosed herein. The memory 1330 could be distributed or local and the processor device 1320 could be distributed or singular. The memory 1330 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1320. With this definition, information on a network, accessible through network interface 1325, is still within memory 1330 because the processor device 1320 can retrieve the information from the network. It should be noted that each distributed processor that makes up processor device 1320 generally contains its own addressable memory space. It should also be noted that some or all of computer system 1310 can be incorporated into an application-specific or general-use integrated circuit.

Optional display 1340 is any type of display suitable for interacting with a human user of apparatus 1300. Generally, display 1340 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A CAD-based method for designing a lithographic mask for nanowire-based devices, the method comprising the steps of:
   (a) creating a design for the lithographic mask from existing design data, wherein the design for the lithographic mask includes continuous active area shapes for each of the nanowire-based devices;
   (b) expanding the continuous active area shapes to join all of the continuous active area shapes in the design for the lithographic mask together to form a single polygon shape;
   (c) removing each of the continuous active area shapes from step (a) from the single polygon shape resulting in one or more landing pad shapes;
   (d) dividing the continuous active shapes from step (a) into one or more nanowire mask shapes; and
   (e) merging the landing pad shapes with the nanowire mask shapes to form the lithographic mask which now includes the nanowire mask shapes and the landing pad shapes for anchoring the nanowire mask shapes.

2. The method of claim 1, wherein the existing design data is for a planar complementary metal oxide semiconductor (CMOS) device design.

3. The method of claim 1, wherein the step (d) of dividing the continuous active shapes into one or more nanowire mask shapes comprises the steps of:

translating a width of each of the continuous active area shapes into a given number of nanowire mask shapes; and converting each of the continuous active area shapes into the given number of nanowire mask shapes.

4. The method of claim 3, wherein the width of each of the continuous active area shapes is translated into the given number of nanowire mask shapes using a look up table.

5. The method of claim 1, wherein the step (b) of expanding the continuous active area shapes to join all of the continuous active area shapes in the design for the lithographic mask together comprises the step of:

expanding each of the continuous active area shapes by a constant amount in an x-direction until the continuous active area shapes for each of the nanowire-based devices merge with one another to form the single polygon shape.

6. The method of claim 1, further comprising the step of:

(f) removing one or more of the landing pad shapes from the design for the lithographic mask to unify a length of one or more of the nanowire mask shapes with a length of one or more other of the nanowire mask shapes in the design for the lithographic mask.

7. The method of claim 6, wherein one or more of the landing pad shapes are removed from the design for the lithographic mask to unify a length of all of the nanowire mask shapes in the design for the lithographic mask.

8. The method of claim 1, further comprising the step of:

(g) adding one or more of the landing pad shapes into the design for the lithographic mask to unify a length of one or more of the nanowire mask shapes with a length of one or more other of the nanowire mask shapes in the design for the lithographic mask.

9. The method of claim 1, wherein each of the nanowire-based devices in the design for the lithographic mask comprises only one of the continuous active area shapes.

10. A computer program product for designing a lithographic mask for nanowire-based devices, the computer program product comprising a computer readable storage medium having program instructions embodied therewith, the program instructions executable by a computer to cause the computer to:

(a) create a design for the lithographic mask from existing design data, wherein the design for the lithographic mask includes continuous active area shapes for each of the nanowire-based devices;

(b) expand the continuous active area shapes to join all of the continuous active area shapes in the design for the lithographic mask together to form a single polygon shape;

(c) remove each of the continuous active area shapes from step (a) from the single polygon shape resulting in one or more landing pad shapes;

(d) divide the continuous active shapes from step (a) into one or more nanowire mask shapes; and (e) merge the landing pad shapes with the nanowire mask shapes to form the lithographic mask which now includes the nanowire mask shapes and the landing pad shapes for anchoring the nanowire mask shapes.

* * * * *